United States Patent
Zhu et al.

(10) Patent No.: US 11,165,088 B2
(45) Date of Patent: Nov. 2, 2021

(54) BUTTON BATTERY AND MANUFACTURING METHOD THEREFOR

(71) Applicant: Chongqing VDL Electronics Co., LTD., Chongqing (CN)

(72) Inventors: Chuanqin Zhu, Chongqing (CN); Xianmao Zhou, Chongqing (CN)

(73) Assignee: CHONGQING VDL ELECTRONICS CO., LTD., Chongqing (CN)

(*) Notice: Subject to any disclaimer, the term of this patent is extended or adjusted under 35 U.S.C. 154(b) by 98 days.

(21) Appl. No.: 16/461,487

(22) PCT Filed: Feb. 24, 2017

(86) PCT No.: PCT/CN2017/074734
§ 371 (c)(1),
(2) Date: May 16, 2019

(87) PCT Pub. No.: WO2018/120388
PCT Pub. Date: Jul. 5, 2018

(65) Prior Publication Data
US 2019/0348702 A1  Nov. 14, 2019

(30) Foreign Application Priority Data
Dec. 30, 2016  (CN) .......................... 201611263946.2

(51) Int. Cl.
*H01M 10/04* (2006.01)
*H01M 10/0525* (2010.01)
(Continued)

(52) U.S. Cl.
CPC ... *H01M 10/0427* (2013.01); *H01M 10/0525* (2013.01); *H01M 50/375* (2021.01); *H01M 50/531* (2021.01); *H01M 2200/10* (2013.01)

(58) Field of Classification Search
None
See application file for complete search history.

(56) References Cited

U.S. PATENT DOCUMENTS

| | | |
|---|---|---|
| 5,494,495 A | 2/1996 | Tuttle |
| 5,939,217 A | 8/1999 | Tamura et al. |

(Continued)

FOREIGN PATENT DOCUMENTS

| | | |
|---|---|---|
| CN | 2631051 | 8/2004 |
| CN | 2631051 Y * | 8/2004 |

(Continued)

OTHER PUBLICATIONS

Extended European Search Report for corresponding EP Application No. 17886671.1, dated May 14, 2020—7 pages.

(Continued)

*Primary Examiner* — Daniel S Gatewood
(74) *Attorney, Agent, or Firm* — Dority & Manning, P.A.

(57) ABSTRACT

A button battery and a manufacturing method thereof are provided. The button battery includes a housing with a positive electrode shell and a negative electrode shell, wherein a plurality of positive electrode plates and a plurality of negative electrode plates are provided in the housing. The positive electrode plates and negative electrode plates are stacked at intervals to form a columnar cell. The positive electrode plates and the negative electrode plates are connected to the positive electrode shell and the negative electrode shell through a current collector respectively.

11 Claims, 3 Drawing Sheets

(51) Int. Cl.
*H01M 50/375* (2021.01)
*H01M 50/531* (2021.01)

(56) References Cited

U.S. PATENT DOCUMENTS

| | | | |
|---|---|---|---|
| 6,610,353 B1 | 8/2003 | Gibbons et al. | |
| 2009/0029238 A1* | 1/2009 | Schubert | H01M 50/171 |
| | | | 429/56 |
| 2019/0348702 A1 | 11/2019 | Zhu et al. | |

FOREIGN PATENT DOCUMENTS

| | | | | |
|---|---|---|---|---|
| CN | 2842757 | | 11/2006 | |
| CN | 2874790 | | 2/2007 | |
| CN | 2874790 Y | * | 2/2007 | .......... H01M 50/528 |
| CN | 103441237 | | 12/2013 | |
| CN | 203445186 | | 2/2014 | |
| CN | 105552275 | | 5/2016 | |
| EP | 2533324 | | 12/2012 | |
| EP | 3531474 A1 | | 8/2019 | |
| GB | 2254478 | | 10/1992 | |
| JP | S 57-161866 U | | 10/1982 | |
| JP | H09115498 A | | 5/1997 | |
| JP | H10188947 A | | 7/1998 | |
| JP | H10289729 A | | 10/1998 | |
| JP | 2003045379 A | | 2/2003 | |
| JP | 2003045494 A | | 2/2003 | |
| JP | 2005310577 A | | 11/2005 | |
| JP | 2006147268 A | | 6/2006 | |
| JP | 2009295446 A | | 12/2009 | |
| JP | 2012048989 A | | 3/2012 | |
| JP | 2013187530 A | | 9/2013 | |
| JP | 2014149935 A | | 8/2014 | |
| JP | 2016225307 A | | 12/2016 | |
| KR | 20130014489 A | | 2/2013 | |
| WO | WO2007/079617 | | 7/2007 | |
| WO | WO2018/120388 | | 7/2018 | |

OTHER PUBLICATIONS

Examination Search Report for corresponding Canadian Application No. 3,043,360, dated Apr. 21, 2020—3 pages.

Notice of Reason for Refusal (w/ English translation) for corresponding Japanese Application No. 2019-546955, dated Jun. 12, 2020—12 pages.

Korean Office Action (w/ English translation) corresponding to Korean Application No. KR1020197014439, dated Dec. 21, 2020—12 pages.

* cited by examiner

BUTTON BATTERY AND MANUFACTURING METHOD THEREFOR

CROSS-REFERENCE TO RELATED APPLICATIONS

This application is a national stage of International Application No. PCT/CN2017/074734, filed on Feb. 24, 2017, which claims priority to Chinese Patent Application No. 201611263946.2, filed on Dec. 30, 2016. Both of the aforementioned applications are hereby incorporated by reference in their entireties.

TECHNICAL FIELD

The present disclosure relates to a technical field of battery technology, and in particular relates to a button battery and a manufacturing method thereof.

BACKGROUND

With the development of the economy and the progress of society, it becomes increasingly intelligent and convenient for people's lives. Various electronic devices can dramatically reduce people's workload, which makes people work more efficiently. In this regard, the battery is one of the essential parts used to keep electronic device function.

A button battery is a battery fully sealed with metal shell, which is characterized by a small battery size, an excellent sealing performance, and a low discharge current. Therefore, it is widely used in computers, hearing aids, electronic watches, radios and various electronic gadgets. However, presently the cells of the button batteries are mostly made by winding (as shown in FIG. 1), which is formed by winding a positive electrode plate 100, a film 101, and a negative electrode plate 102 together. Since the misalignment of the winding is inevitable, there must be a certain height error in the cell formed by winding. In addition, since a positive electrode plate 100 is connected to the housing 104 only through one positive electrode tab 103 and a negative electrode plate 102 is connected to the housing 104 only through one negative electrode tab 105, consequently the battery has drawbacks such as high internal resistance, low rate discharge and easy to get short circuit.

SUMMARY

In view of the above problems, an object of the present disclosure is to provide a button battery having a small internal resistance of a battery and capable of discharging a large current, and a method of manufacturing the same.

In order to achieve the above object, the present disclosure provides a button battery, which includes: a housing with a positive electrode shell and a negative electrode shell, a plurality of positive electrode plates and negative electrode plates provided in the housing; and a columnar cell, wherein the columnar cell is formed by stacking positive electrode plates and negative electrode plates at intervals, the positive electrode plates are connected to the positive electrode shell through a first current collector, and the negative electrode plates are connected to the negative electrode shell through a second current collector.

In an embodiment, the positive electrode plates and the negative electrode plates are alternately arranged, so as to enable each positive electrode plate to interact with adjacent negative electrode plates thereof.

In an embodiment, the number of positive electrode plates is the same as the number of negative electrode plates, and one positive electrode plate and one negative electrode plate are respectively provided at end surfaces of the columnar cell.

In an embodiment, a film is provided between each positive electrode plate and the adjacent negative electrode plates thereof.

In an embodiment, each positive electrode plate or each negative electrode plate is enclosed with the film.

In an embodiment, the film is positioned in an interval between each positive electrode plate and adjacent negative electrode plates thereof.

In an embodiment, at least one positive electrode tab is provided on each positive electrode plate, and the positive electrode tabs are combined to form the first current collector; and at least one negative electrode tab is provided on each negative electrode plate, and the negative electrode tabs are combined to form the second current collector.

In an embodiment, the positive electrode plate and the negative electrode plate have a circular, polygonal or arcuate structure.

In an embodiment, active material is applied on each positive electrode plate and each negative electrode plate.

In an embodiment, the first current collector and the second current collector are respectively located on different sides of the columnar cell, and an angle between the first current collector and the second current collector is more than 0° and less than or equal to 180°, to prevent interference of the first current collector with the second current collector.

In an embodiment, a relief valve for venting the gas inside of the housing is provided at a bottom of the positive electrode shell or the negative electrode shell.

In an embodiment, the relief valve includes at least one through-hole and hot melt material filled in the through-hole.

In an embodiment, the relief valve includes at least one through-hole, which is covered by a spacer provided in the housing, and the spacer is connected to the first current collector.

A manufacturing method of a button battery, including:

apply active material to the positive electrode plate and the negative electrode plate, respectively, and dispose each of the positive electrode plates and each of the negative electrode plates by stacking at intervals in a housing to form a columnar cell;

connect the first current collector coupled to each of the positive electrode plates with the positive electrode shell through the aluminum foil;

connect the second current collector coupled to each of the negative electrode plates with the negative electrode shell through the copper foil;

provide a film between each positive electrode plate and the adjacent negative electrode plates;

place a sealing ring between the positive electrode shell and the negative electrode shell to form a housing, wherein the sealing ring is internally glued or integrally dipped with glue;

bake the housing; and inject, seal, form, and grade the baked housing.

In an embodiment, each positive electrode plate and each negative electrode plate are formed by punching or laser cutting, and the aluminum foil and the copper foil are joined to the positive electrode shell and the negative electrode shell respectively by ultrasonic welding or electric resistance welding.

In an embodiment, the surface of the film is coated with glue, and the film, the positive electrode plate and the negative electrode plate are thermally jointed into an integral structure by a heating pressing process.

The disclosure adopts the above technical solutions, and has the following advantages: 1. According to the embodiments of the present disclosure, there are a plurality of positive electrode plates and a plurality of negative electrode plates, and at least one electrode tab is provided on each of the positive electrode plates and each of the negative electrode plates. Since a plurality of tabs are used for conducting the current, the internal resistance of the battery is reduced, and achieves excellent performance of the high rate discharge ability. 2. The positive electrode plate and the negative electrode plate of the present disclosure can effectively control the total height of the button battery by adopting a manner of alternative arrangement at intervals. 3. The first current collector and the second current collector of the present disclosure are respectively located on both sides of the cell, wherein one end of the cell is a positive electrode plate, and the other end a negative electrode plate. The first current collector and the second current collector are respectively connect to the positive electrode shell and the negative electrode shell, thereby preventing short circuit due to poor insulation. 4. Since the button battery of the present disclosure is provided with a relief valve at the bottom of the housing, thus when the internal pressure of the button battery is increased by overheating, the gas inside the button battery housing can be discharged through the relief valve to relieve the pressure and the temperature.

The above summary is for the purpose of illustration only and is not intended to be limiting. In addition to the illustrative aspects, embodiments and features described above, further aspects, embodiments and features of the present disclosure will be readily apparent.

BRIEF DESCRIPTION OF THE DRAWINGS

In the drawings, the same reference numerals denote the same or similar parts or elements throughout all the drawings unless otherwise specified. The drawings are not necessarily drawn to scale. It should be understood that these drawings depict only some embodiments disclosed in accordance with present utility model and should not be construed as limiting the scope of present utility model.

DETAILED DESCRIPTION

Figure 1:
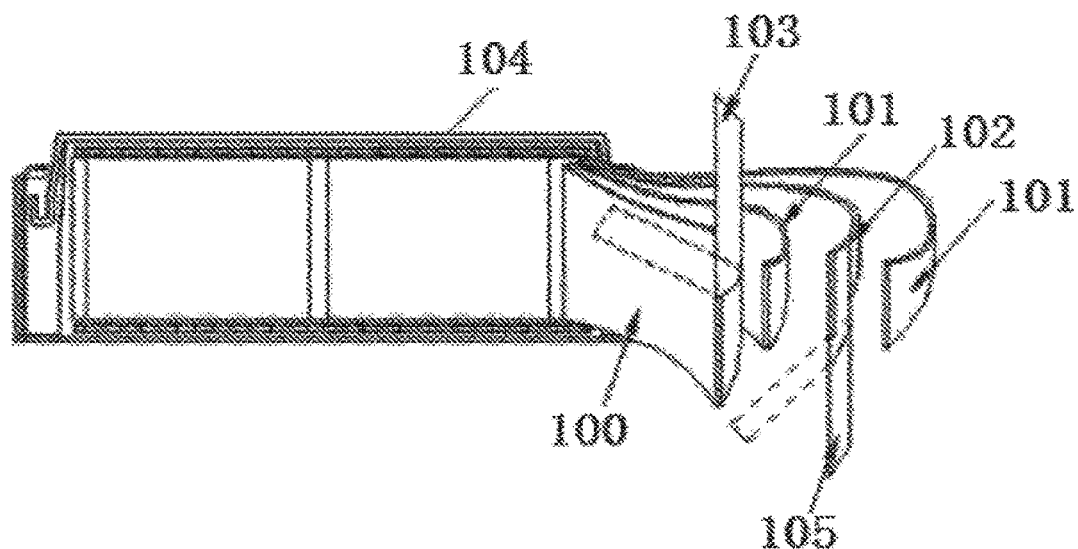
FIG. 1 is a schematic structural view of a wound cell of a conventional button battery.

In the following, only certain embodiments are briefly described. As can be recognized by those skilled in the art, various modifications may be made to the described embodiments without departing from the spirit or scope of present disclosure. Therefore, the drawings and the description are substantially regarded as exemplary intrinsically rather than restrictive.

In the description of the present disclosure, it should be noted that, unless otherwise specified, the meaning of "a plurality" is two or more; the terms "up, down, left, right, inside, outside, front end, rear end, head, tail" etc. indicate the orientation or positional relationship which is based on the orientation or positional relationship shown in the drawings, and is merely for convenience of describing the present disclosure and simplification of the description, and does not indicate or imply the indicated device or elements must have a particular orientation, be constructed and operated in a particular orientation, and therefore should not be construed as limitations to the disclosure.

Figure 2:
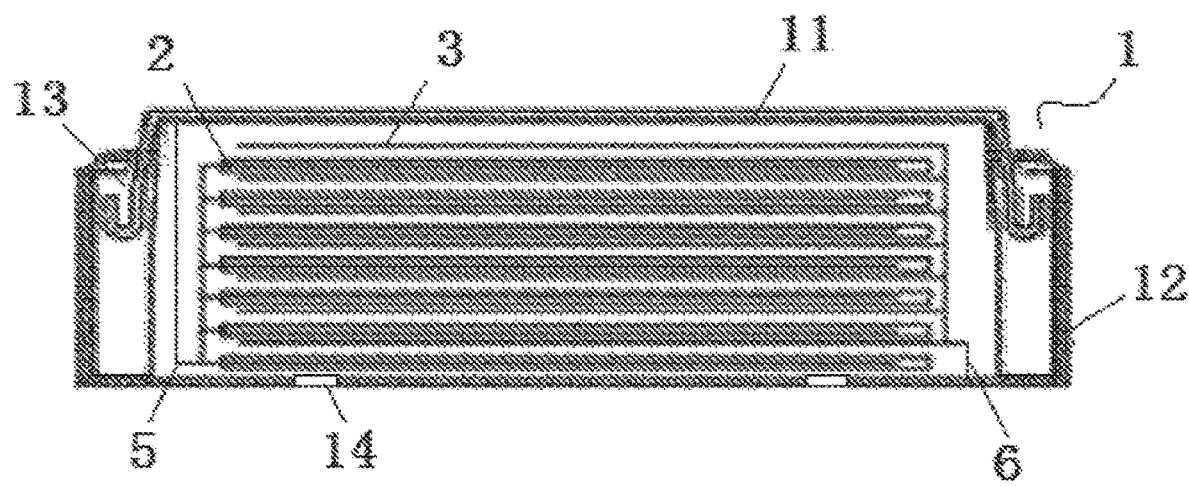
FIG. 2 is a schematic view of an overall structure according to an embodiment of the present disclosure.

As shown in FIG. 2, the present disclosure provides a button battery including a housing 1, and the housing 1 includes a positive electrode shell 11 and a negative electrode shell 12. A plurality of positive electrode plates 2 and negative electrode plates 3 are horizontally provided in the housing 1, and each positive electrode plate 2 and each negative electrode plate 3 are stacked at intervals equally in the axial direction of the housing 1 to form a columnar cell 4. Each positive electrode plate 2 is connected to the positive electrode shell 11 through a first current collector 5, while each negative electrode plate 3 is connected to the negative electrode shell 12 through a second current collector 6.

Figure 3:
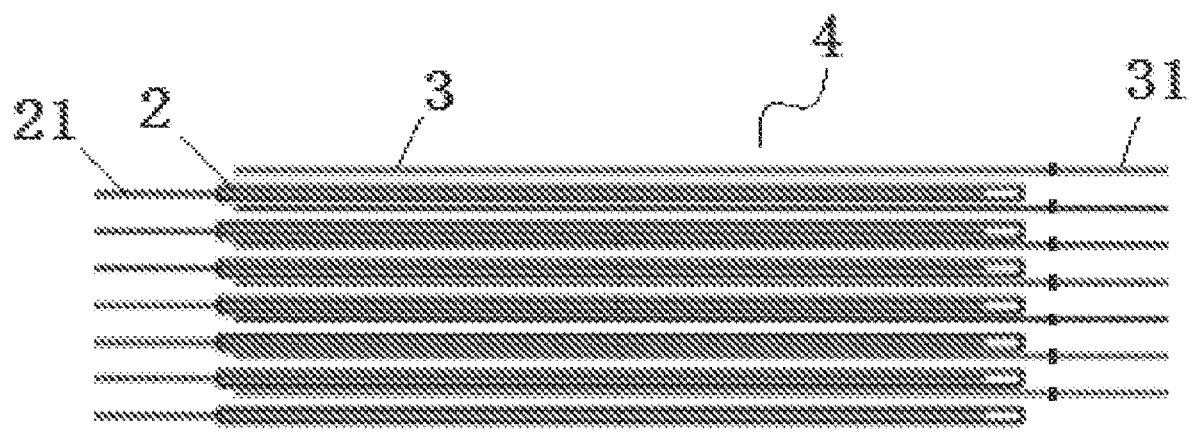
FIG. 3 is a schematic view showing an arrangement of positive electrode plates and negative electrode plates according to an embodiment of the present disclosure.

As shown in FIG. 3, in order to control the height of the button battery, each positive electrode plate 2 and each negative electrode plate 3 are alternately arranged, that is, a positive electrode plate 2, a negative electrode plate 3, a positive electrode plate 2, a negative electrode plate 3 . . . and a negative electrode plate 3 are stacked successively, so that each positive electrode plate 2 can interact with adjacent negative electrode plates 3 thereof to improve work efficiency.

Further, the number of the positive electrode plates 2 is the same as that of the negative electrode plates 3, and it is necessary to guarantee that the positive electrode plate 2 and the negative electrode plate 3 are at the ends of the columnar core 4 formed by stacking, respectively, that is, one end of the columnar cell 4 is a positive electrode plate and the other is a negative electrode plate.

It should be noted that both the positive electrode plates 2 and the negative electrode plates 3 are at least two pieces each. The number of the positive electrode plates 2 may be also different from that of the negative electrode plates 3, as long as the positive electrode plate 2 and the negative electrode plate 3 are at the ends of the columnar core 4 respectively.

Figure 4:
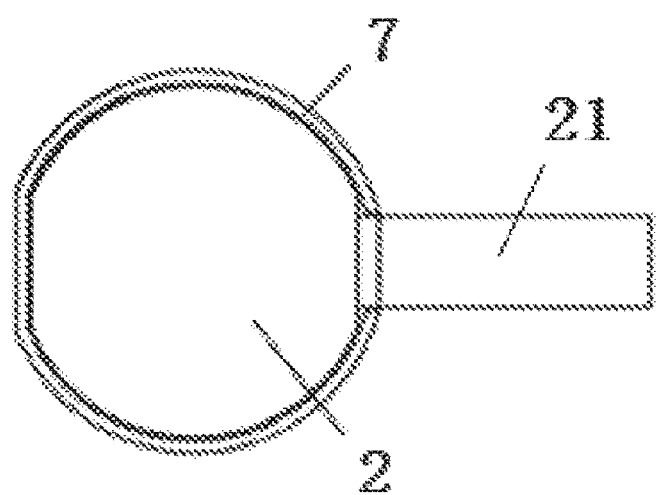
FIG. 4 is a schematic structural view of an electrode plate according to an embodiment of the present disclosure.

As shown in FIG. 4, in order to avoid short circuit due to a contact between the positive electrode plate 2 and the negative electrode plate 3, a film 7 may be provided between each positive electrode plates 2 and the adjacent negative electrode plates 3 thereof.

In a preferred embodiment, a film 7 can be set on each positive electrode plate 2 or each negative electrode plate 3, thereby fixing the film 7. All the films 7 may be set on the positive electrode plates 2 or the negative electrode plates 3.

In a preferred embodiment, a film 7 may also be positioned in an interval between each positive electrode plate 2 and the adjacent negative electrode plates 3 thereof. It should be noted that the film 7 may be installed in other ways to guarantee the positive electrode plate 2 and the negative electrode plate 3 without contacting each other, and it is not limited to the above.

As shown in FIG. 3, in order to reduce the internal resistance of the button battery, at least one positive electrode tab 21 may be provided on each positive electrode plate 2, and the positive electrode tabs 21 of each positive electrode plate 2 are combined to form the first current collector 5. Meanwhile, at least one negative electrode tab 31 may be provided on each negative electrode plate 3, and the negative electrode tabs 31 of each negative electrode plate 3 are combined to form the second current collector 6.

In order to prevent the positive electrode tab 21 of the positive electrode plate 2 from interfering with the negative electrode tab 31 of the negative electrode plate 3 during installing resulting in short circuit, the shapes of the positive electrode plate 2 and the negative electrode plate 3 may be circular, polygonal or arcuate.

Figure 5:
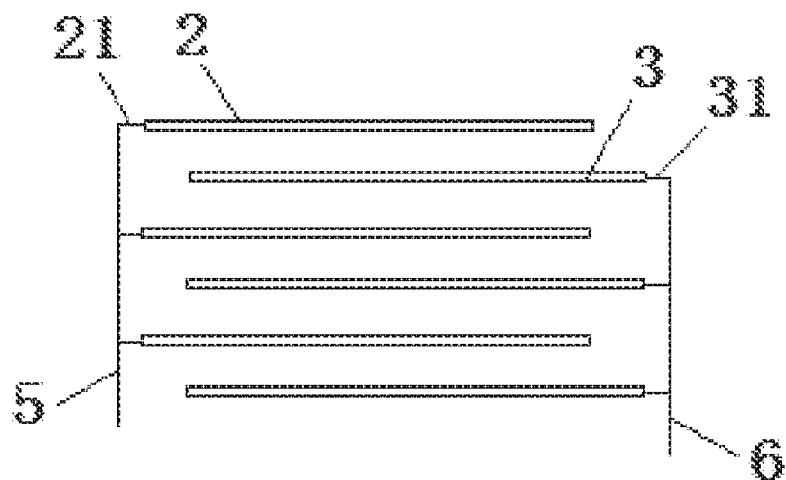
FIG. 5 is a layout view of positive electrode plates and negative electrode plates in a preferred embodiment according to the present disclosure.

In a preferred embodiment, when the positive electrode plate 2 and the negative electrode plate 3 are circular shaped, the positive electrode plate 2 and the negative electrode plate 3 cannot be completely overlapped on each other upon being stacked. An offset arrangement is required to keep the edge of the positive electrode plate 2, connected with the positive electrode tab 21 away from the corresponding edge of the negative electrode plate 3, and keep the edge of the negative electrode plate 3, connected with the negative electrode tab 31 away from the corresponding edge of the positive electrode plate 2 (as shown in FIG. 5).

In a preferred embodiment, when the positive electrode plate 2 and the negative electrode plate 3 are polygonal shaped, the positive electrode plate 2 and the negative electrode plate 3 cannot be completely overlapped on each other upon being stacked. An offset arrangement is required to keep the edge of the positive electrode plate 2, connected with the positive electrode tab 21 away from the corresponding edge of the negative electrode plate 3, and keep the edge of the negative electrode plate 3, connected with the negative electrode tab 31 away from the corresponding edge of the positive electrode plate 2.

Figure 6:
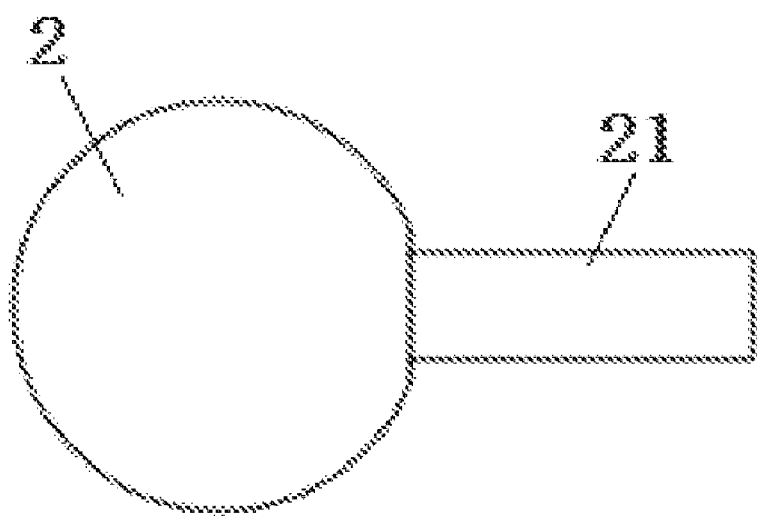
FIG. 6 is a schematic view showing a structure of an electrode plate in a preferred embodiment according to the present disclosure.

In a preferred embodiment, when the positive electrode plate 2 and the negative electrode plate 3 are arcuate shaped, that is, at least one chord is provided at the edge of the circle to form an arcuate structure with major arc (as shown in FIG. 6), the positive electrode plate 2 and the negative electrode plate 3 can be completely overlapped and stacked concentrically. The positive electrode tab 21 is provided at the chord of the positive electrode plate 2, while the negative electrode tab 31 is provided at the chord of the negative electrode plate 3. The chord of the positive electrode plate 2 is corresponding to the major arc of the negative electrode plate 3, and the chord of the negative electrode plate 3 is corresponding to the major arc of the positive electrode plate 2 during stacking, thereby preventing the positive electrode tab 21 from interfering with the negative electrode plate 3, as well as preventing the negative electrode tab 31 from interfering with the positive electrode tab 2.

In addition, the positive electrode plate 2 and the negative electrode plate 3 may be stacked in the same shape as described above, or in respective shape of the above three shapes, as long as the tab of the positive electrode plate 2 does not interfere with the tab of the negative electrode plate 3.

In order to prevent the button battery from being damaged due to overheating, a relief valve for venting the gas inside of the housing 1 is provided at a bottom of the housing 1. The relief valve includes at least one through-hole 14 provided at the bottom of the housing 1, and the through-hole 14 is filled with hot melt material that is in solid state in the range of −40 to 130° C. When the battery is heated (due to overcharging, short circuit, high temperature environment or improper use) to 130° C. or above, the internal pressure of the button battery is increased, the hot melt material is melted so as to open the through-hole 14. Thus, the gas inside is discharged from the housing 1 via the through-hole 14, realizing safe use of the battery.

The hot melt materials can be chosen from the group including asphalt, vulcanized rubber, polyethylene, polypropylene, polyvinyl chloride, polystyrene, polyoxymethylene, polycarbonate, polyamide, acrylic plastics, polysulfone, polyphenylene ether, other polyolefins, and copolymers thereof etc.

It should be noted that the through-hole 14 may also be sealed by a spacer within the housing 1. The spacer is covered on the through-hole 14. The spacer is connected to the first current collector 5, and may be an aluminum foil sheet having a thickness between 0.01 mm −0.2 mm, more preferably between 0.01 mm −0.1 mm. The aluminum foil sheet covering the through-hole 14 is in mechanical contact with the bottom of the housing 1 to achieve current passing. Since the through-hole 14 is provided at the bottom of the housing 1, the bottom of the housing 1 does not need to be sealed. When an internal pressure of the battery is high due to an overuse, the pressure will break through the aluminum foil sheet to allow gas to escape from the through-hole 14, thereby achieving pressure relief.

Further, in order to facilitate fix the aluminum foil sheet, the shape of the aluminum foil sheet matches the shape of the bottom of the housing 1, and the spacer is joined to the first current collector 5 by ultrasonic or spot welding.

In the above embodiment, a secondary lithium ion battery active material that can be embedded and de-embedded is provided on each positive electrode plate 2 and each negative electrode plate 3. The active material coated on the positive electrode plate 2 includes at least one of lithium cobalt oxide, lithium cobalt nickel manganese oxide, lithium manganate, and lithium iron phosphate; while the active material coated on the negative electrode plate 3 includes at least one of graphite, silicon carbon, and lithium titanate.

In the above embodiment, the first current collector 5 and the second current collector 6 are respectively located on two sides of the columnar cell 4, and an angle between the first current collector 5 and the second current collector 6 is more than 0°, and less than or equal to 180°.

In the above embodiment, each positive electrode tab 21 is connected to the positive electrode shell 11 by an aluminum foil, and each negative electrode tabs 31 is connected to the negative electrode shell 12 by a copper foil.

In the above embodiment, the positive electrode shell 11 and the negative electrode shell 12 are locked together by a sealing ring 13 (as shown in FIG. 2). The positive electrode shell 11 and the negative electrode shell 12 are made of metal material. It should be noted that the positive electrode shell 11 may be selected as an upper portion of the housing or a lower portion of the housing according to work requirements.

In the above embodiment, the film 7 is made of PE (polyethylene) or PP (polypropylene).

In the above steps, the first current collector 5 and the second current collector 6 are respectively located on different sides of the columnar cell 4, and an angle between the first current collector 5 and the second current collector 6 is more than 0°, and less than or equal to 180°, preventing the first current collector from interfering with the second current collector.

Based on the above device, the present disclosure also includes a manufacturing method of a button battery, comprising the following steps.

Active material is applied to a positive electrode plate 2 and a negative electrode plate 3 respectively, and each positive electrode plates 2 and each negative electrode plates 3 are stacked at intervals in a housing 1 to form a columnar cell 4.

The first current collector 5 coupled to each positive electrode plate 2 is connected with the positive electrode shell 11 through an aluminum foil;

The second current collector 6 coupled to each negative electrode plates 3 is connected with the negative electrode shell 12 through a copper foil;

A film 7 is provided between each positive electrode plate 2 and the adjacent negative electrode plates 3 thereof.

A sealing ring is placed on the columnar cell 4, wherein the sealing ring is internally dispended or integrally gum dipped.

The columnar cell 4 is baked, and the baked columnar cell 4 is injected, sealed, formed, and graded to form the button battery.

In the above steps, each positive electrode plates 2 and each negative electrode plates 3 are formed by punching or laser cutting, and the aluminum foil and the copper foil are joined to the positive electrode shell and negative electrode shell respectively by ultrasonic welding or electric resistance welding.

In the above steps, the surface of the film 7 is coated with glue, that is, the surface of the film 7 is coated with polymer material such as polyvinylidene fluoride or a copolymer of hexafluoropropylene and vinylidene fluoride. After stacking, the positive electrode plate 2, the negative electrode plate 3 and the film 7 are thermally jointed into an integral structure by a heating pressing process (temperature of 50~100 degrees, pressure of 1~20 kg/cm$^2$, time of 0.1~60 minutes), so that the structure of the columnar cell is more stable and does not peel off. Thus, the interval between the positive electrode plate 2 and the negative electrode plate 3 is consistent, lowering internal resistance and improving electrical performance.

In the above steps, in order to prevent an acute short circuit after connecting the positive electrode tab 2 with the negative electrode plate 3, an insulating glue is applied to the positive electrode tab 21 of each positive electrode tab 2. Thus, a short circuit between each tab 21 and the negative electrode upon bending for welding is avoided.

It should be noted that the insulating glue may be a solution of NMP (N-methylpyrrolidone) of polyvinylidene fluoride or a solution of SBR (styrene-butadiene rubber), and the thickness of the coating is 0.001 mm –0.01 mm on one side. The insulating glue may be applied to the inner side, broadsides or base of the positive electrode tabs 21.

The above is only the specific embodiment of the present disclosure, but the scope of the present disclosure is not limited thereto, and any person skilled in the art can easily think of various changes or replacements within the technical scope of the present disclosure. Instead, these should be covered by the scope of the present disclosure. Therefore, the scope of protection of the present disclosure shall be subject to the scope of protection of the claims.

What is claimed is:

1. A button battery, comprising: a housing with a positive electrode shell and a negative electrode shell; a plurality of positive electrode plates and a plurality of negative electrode plates provided in the housing; and a columnar cell, wherein the columnar cell is formed by stacking positive electrode plates and negative electrode plates at intervals, the positive electrode plates are connected to the positive electrode shell through a first current collector, and the negative electrode plates are connected to the negative electrode shell through a second current collector;

wherein a relief valve for venting the gas inside of the housing is provided at a bottom of the positive electrode shell or the negative electrode shell, and wherein the relief valve comprises at least one through-hole, and hot melt material filled in the through-hole.

2. The button battery of claim 1, wherein the positive electrode plates and the negative electrode plates are alternately arranged, so as to enable each positive electrode plate to interact with adjacent negative electrode plates thereof.

3. The button battery of claim 2, wherein the number of positive electrode plates is the same as the number of negative electrode plates, and one positive electrode plate and one negative electrode plate are respectively provided at end surfaces of the columnar cell.

4. The button battery of claim 2, wherein a film is provided between each positive electrode plate and the adjacent negative electrode plates thereof.

5. The button battery of claim 4, wherein each positive electrode plate or each negative electrode plate is enclosed with the film.

6. The button battery of claim 4, wherein the film is positioned in an interval between each positive electrode plate and adjacent negative electrode plates thereof.

7. The button battery of claim 1, wherein at least one positive electrode tab is provided on each positive electrode plate, and the positive electrode tabs are combined to form the first current collector; and at least one negative electrode tab is provided on each negative electrode plate, and the negative electrode tabs are combined to form the second current collector.

8. The button battery of claim 1, wherein the positive electrode plate and the negative electrode plate have a circular, polygonal or arcuate structure.

9. The button battery of claim 1, wherein active material is applied on the positive electrode plates and the negative electrode plates.

10. The button battery of claim 1, wherein the first current collector and the second current collector are respectively located on different sides of the columnar cell, and an angle between the first current collector and the second current collector is more than 0° and less than or equal to 180°, to prevent interference of the first current collector with the second current collector.

11. The button battery of claim 1, wherein the relief valve comprises at least one through-hole, which is covered by a spacer provided in the housing, and the spacer is connected to the first current collector.

* * * * *